United States Patent
Chan et al.

(10) Patent No.: US 8,411,542 B2
(45) Date of Patent: Apr. 2, 2013

(54) METHOD FOR CONTROLLING LAYER CHANGES FOR AN OPTICAL DISK DRIVE

(75) Inventors: Kun-Yi Chan, Zhubei (TW); Yu-Chun Lin, Hsin-Chu (TW); Ying-Feng Huang, Chia-Yi Hsien (TW)

(73) Assignee: Mediatek, Inc., Hsin-Chu (TW)

( * ) Notice: Subject to any disclaimer, the term of this patent is extended or adjusted under 35 U.S.C. 154(b) by 270 days.

(21) Appl. No.: 12/866,985

(22) PCT Filed: Mar. 14, 2008

(86) PCT No.: PCT/CN2008/070497
§ 371 (c)(1), (2), (4) Date: Aug. 10, 2010

(87) PCT Pub. No.: WO2009/111917
PCT Pub. Date: Sep. 17, 2009

(65) Prior Publication Data
US 2010/0315913 A1  Dec. 16, 2010

(51) Int. Cl.
*G11B 7/00* (2006.01)

(52) U.S. Cl. .............. 369/53.23; 369/94; 369/44.23

(58) Field of Classification Search ............ 369/44.23, 369/53.23, 53.28, 94, 283, 44.25
See application file for complete search history.

(56) References Cited

U.S. PATENT DOCUMENTS

| | | | |
|---|---|---|---|
| 5,966,355 A | 10/1999 | Kamiyama | |
| 6,480,444 B2 | 11/2002 | Tada et al. | |
| 6,756,574 B2 | 6/2004 | Higuchi | |
| 6,775,208 B1 | 8/2004 | Liu et al. | |
| 6,906,986 B2 | 6/2005 | Lee et al. | |
| 6,954,417 B2 | 10/2005 | Komma et al. | |
| 7,027,378 B2 | 4/2006 | Komma et al. | |
| 7,126,899 B2 | 10/2006 | Ichimura et al. | |
| 7,327,642 B2 * | 2/2008 | Yamada et al. | 369/44.29 |

(Continued)

FOREIGN PATENT DOCUMENTS

| | | |
|---|---|---|
| CN | 1151069 | 6/1997 |
| CN | 1929002 | 3/2007 |

(Continued)

OTHER PUBLICATIONS

English language translation of abstract of TW 200506908 (published Feb. 16, 2005).

(Continued)

*Primary Examiner* — Thomas Alunkal
(74) *Attorney, Agent, or Firm* — McClure, Qualey & Rodack, LLP

(57) ABSTRACT

A method for controlling layer changes for an optical disk drive is provided, where a focus of a laserbeam emitted by a pickup head of the optical disk drive is moved from a current data layer of a disk to a target data layer of the disk. First, a position of a collimator lens of the pickup head is adjusted for spherical aberration correction. The objective lens is then lowered to a low position to move the focus of the laserbeam off the surface of the disk. The objective lens is then raised towards the disk. A focusing error signal is generated while the objective lens is being raised. Whether a target S-curve corresponding to the target data layer is present in the focusing error signal is then started to be detected. If the target S-curve is detected, the focus on operation on the target data layer of the disk is successful.

16 Claims, 7 Drawing Sheets

U.S. PATENT DOCUMENTS

| | | | |
|---|---|---|---|
| 7,586,816 B2 | 9/2009 | Yumita | |
| 7,751,291 B2* | 7/2010 | Feng et al. | 369/53.23 |
| 2003/0202437 A1 | 10/2003 | Yamada et al. | |
| 2004/0207944 A1* | 10/2004 | Ichimura | 360/81 |
| 2004/0228232 A1 | 11/2004 | Takahashi et al. | |
| 2007/0121471 A1* | 5/2007 | Isshiki et al. | 369/112.02 |
| 2007/0171784 A1* | 7/2007 | Kim et al. | 369/44.35 |
| 2007/0206459 A1 | 9/2007 | Iwamoto et al. | |
| 2008/0175107 A1* | 7/2008 | Kuijper et al. | 369/44.23 |

FOREIGN PATENT DOCUMENTS

| | | |
|---|---|---|
| EP | 1 357 548 | 10/2003 |
| EP | 1 408 488 | 4/2004 |
| EP | 1 752 978 | 2/2007 |
| TW | 564404 | 12/2003 |
| TW | 200506908 | 2/2005 |
| TW | 200643925 | 12/2006 |

OTHER PUBLICATIONS

English language translation of abstract of TW 200643925 (published Dec. 16, 2005).

English language translation of abstract of CN 1151069 (published Jun. 4, 1997).

English language translation of abstract of CN 1929002 (published Mar. 14, 2007).

English language translation of abstract of TW 564404 (published Dec. 1, 2003).

* cited by examiner

METHOD FOR CONTROLLING LAYER CHANGES FOR AN OPTICAL DISK DRIVE

CROSS REFERENCE TO RELATED APPLICATION

This application is the 35 U.S.C. §371 national stage of PCT application PCT/CN2008/070497, filed Mar. 14, 2008, the disclosure of which is hereby incorporated by reference.

BACKGROUND OF THE INVENTION

1. Field of the Invention

The invention relates to optical disk drives, and more particularly to layer changes for optical disk drives.

2. Description of the Related Art

Current optical disks have higher and higher data densities to store greater amounts of data in a single disk. Some optical disks, such as dual-layer Digital Versatile Disks (DVD) and Blu-ray Disks (BD), have multiple data layers for data storage. Referring to FIG. 1, a schematic diagram of an optical disk drive 100 is shown. The optical disk drive 100 has a pickup head 110 to access data of a disk 120. The disk 120 has a cover layer 126 and two data layers 122 and 124. To access data recorded on a target data layer selected from the data layers 122 and 124 of the disk 120, the optical disk drive must focus a laserbeam 106 emitted by the pickup head 110 on the target data layer to obtain a reflection signal reflected from the target data layer, and the reflection signal is then processed to obtain the data recorded on the target data layer.

When the laserbeam 106 is focused on a current data layer but the optical disk drive 100 requires accessing a target data layer different from the current data layer, the optical disk drive must perform a layer change procedure to focus the laserbeam on the target data layer. To carry out the layer change procedure, a spherical aberration correction process and a focus search process are performed. First, the optical disk drive 100 must trigger a stepping motor to move a collimator lens 102 of the pickup head 110, thus adjusting a relative distance between an objective lens 104 and the collimator lens 102 to perform a spherical aberration correction. In addition, the optical disk drive 100 must trigger a focus coil to alter the vertical position of the pickup head 110 until a focus of the laserbeam 106 is projected on the target data layer, referred to as a focus search procedure.

Conventional methods for controlling layer changes have shortages. First, when an optical disk drive 100 performs a focus search process, the optical disk drive 100 determines whether a focus of the laserbeam 106 is projected on a target data layer by detecting whether an S-curve is present in a focus error signal when the vertical position of the objective lens 104 is adjusted. If an S-curve is present, the focus is projected directly on a target data layer and the vertical position of the objective lens 104 is fixed to the current position. Otherwise, if no S-curve is detected, the objective lens 104 keeps searching until an S-curve is detected, and the objective lens 104 may collide with the surface of the optical disk 120.

In addition, when an optical disk 120 is clamped on a tray of an optical disk drive 100, the surface of the optical disk 120 is not always perpendicular to a spindle axis of the optical disk drive 100. If the surface of the optical disk 120 is not perpendicular to the spindle axis, the surface of the optical disk 120 periodically moves up and down with a revolution angle thereof when the optical disk 120 is spun by a spindle motor. Thus, there is a vertical relative motion between a pickup head of the optical disk drive and the disk surface moving up and down. The relative motion distorts the focus error signal, thus negatively affecting determination of an S-curve and decreasing correctness of a focus search process of the layer change procedure.

Furthermore, because layer changes are frequently performed to access an optical disk, efficiency of the layer change procedure greatly affects performance of the optical disk drive. Because the spherical aberration correction process require longer amounts of time, the time starting the focus search process altering the vertical position of the objective lens 104 must be carefully adjusted according to the timings of the spherical aberration correction procedure, thereby reducing the entire time required by the layer change procedure. Thus, a method for controlling layer changes for an optical disk drive is required.

BRIEF SUMMARY OF THE INVENTION

The invention provides a method for controlling layer changes for an optical disk drive. In one embodiment, a focus of a laserbeam emitted by a pickup head of the optical disk drive is moved from a current data layer of a disk to a target data layer of the disk. First, a spherical aberration correction process is performed with respect to the target data layer. An objective lens of the pickup head is then lowered to a low position to move the focus of the laserbeam off the surface of the disk. The objective lens is then raised towards the disk. A focusing error signal is then generated while the objective lens is being raised. Whether an S-curve corresponding to the target data layer is present in the focusing error signal is then started to be detected.

The invention provides an optical disk drive. In one embodiment, a focus of a laserbeam emitted by a pickup head of the optical disk drive is moved from a current data layer of a disk to a target data layer of the disk for performing a layer change. The optical disk drive comprises the pickup head, a spherical aberration correction module, a focusing error generator, a focus control module, and an S-curve detector. The pickup head generates a reflection signal reflected from the disk with the laserbeam. The spherical aberration correction module adjusts a position of a collimator lens of the pickup head for spherical aberration correction. The focusing error generator generates a focusing error signal according to the refection signal. The focus control module then generates a focus servo output (FOO) signal according to the focusing error signal to control vertical motion of the objective lens of the pickup head. The S-curve detector starts to detect whether an S-curve corresponding to the target data layer is present in the focusing error signal. Wherein the focus control module lowers the objective lens to a low position to move the focus of the laserbeam off the surface of the disk, then raises the objective lens towards the disk, and stops raising the objective lens when the S-curve detector detects the S-curve corresponding to the target data layer.

The invention provides a method for performing a focus search of an optical disk drive. First, an objective lens is being raised towards a disk. A first focusing error signal is then generated while the objective lens is being raised. A first S-curve, a second S-curve, and a third S-curve of the focusing error signal are then determined. A first peak level of the first S-curve, a second peak level of the second S-curve, and a third peak level of the third S-curve are then determined. A first difference between the second peak level and the first peak level is then compared with a second difference between the third peak level and the second peak level. An identification threshold for determining S-curves of the focusing error signal is then set as a first value ranging between the first peak level and the second peak level when the first difference is greater than the second difference. The identification threshold for determining S-curves of the focusing error signal is then set as a second value ranging between the second peak level and the third peak level when the first difference is less than the second difference.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
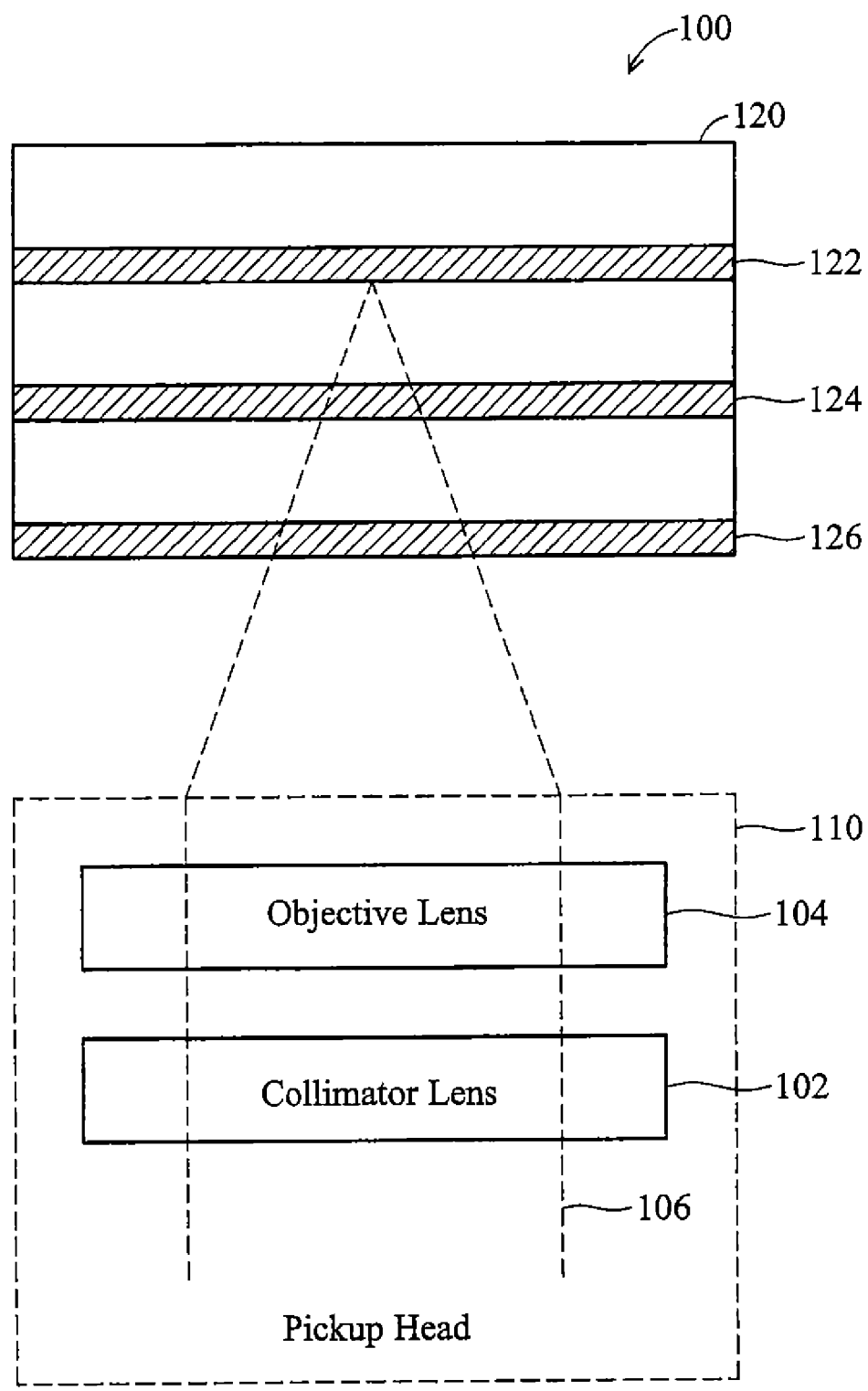
FIG. 1 is a schematic diagram of an optical disk drive.
Figure 2:
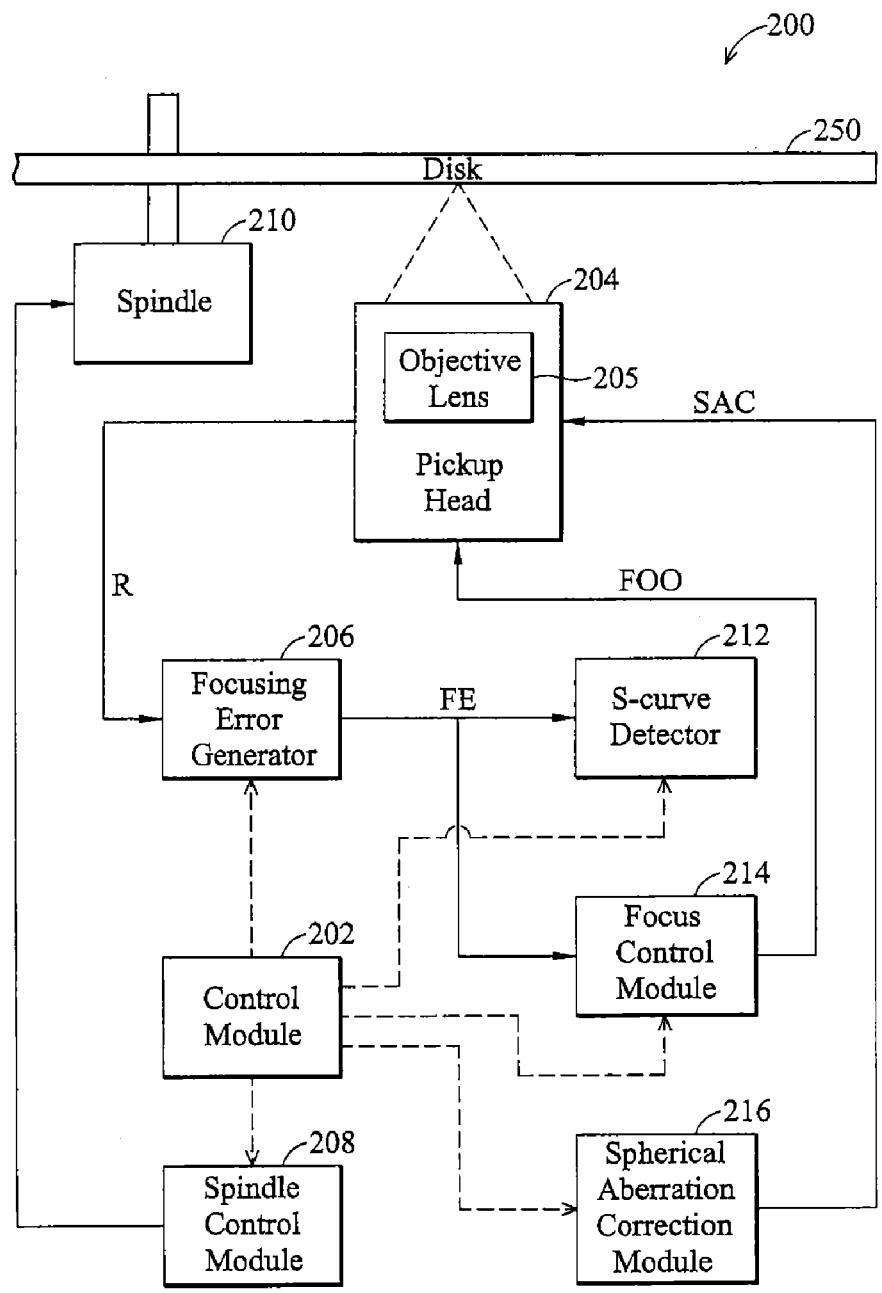
FIG. 2 is a block diagram of an optical disk drive according to the invention.

Referring to FIG. 2, a block diagram of an optical disk drive 200 according to the invention is shown. An optical disk 250 inserted in the optical disk drive 200 has a plurality of data layers parallel to the disk surface. In one embodiment, the disk 250 is a Blu-ray Disk (BD), Digital Versatile Disc (DVD), or High Definition (HD) DVD. The optical disk drive 200 comprises a control module 202, a pickup head 204, a focusing error generator 206, a spindle control module 208, a spindle motor 210, an S-curve detector 212, a focus control module 214, and a spherical aberration correction module 216. The control module 202 controls all the other units of the optical disk drive 200. The spindle control module 208 drives the spindle motor 210 to spin the disk 250. The pickup head 204 projects a focus of a laserbeam on a target data layer of the disk 250 and detects intensity of the reflected laserbeam from the target data layer to obtain a reflection signal R. Thus, data recorded on the target data layer can be derived from the reflection signal R.

If the focus of the laserbeam is projected on a current data layer, but the optical disk drive 200 requires accessing data stored in a target data layer different from the current data layer, the optical disk drive 200 carries out a layer change procedure moving the focus of the laserbeam from the current data layer to the target data layer. A spherical aberration correction process and a focus search process are performed to complete the layer change procedure. The control module 202 controls the spherical aberration correction module 216 to generate a spherical aberration correction signal SAC to adjust a distance between an objective lens 205 and a collimator lens of the pickup head 204, thus performing the spherical aberration correction process.

In addition, the control module 202 controls the focus control module 214 to generate a focus servo output signal FOO to control vertical motion of the objective lens 205 of the pickup head 204. While the objective lens 205 is moving, the focusing error generator 206 derives a focusing error signal FE from the reflection signal R, and the S-curve detector 212 detects whether an S-curve appears in the focusing error signal FE. When the S-curve is present, the pickup head 204 projects a focus of the laserbeam directly on the target data layer and the controller 202 controls the focus control module 214 to hold the objective lens 205 in the current vertical position, completing the focus search process. Thus, the focus of the laserbeam is moved to the target data layer, and a layer change procedure is accomplished.

Figure 3:
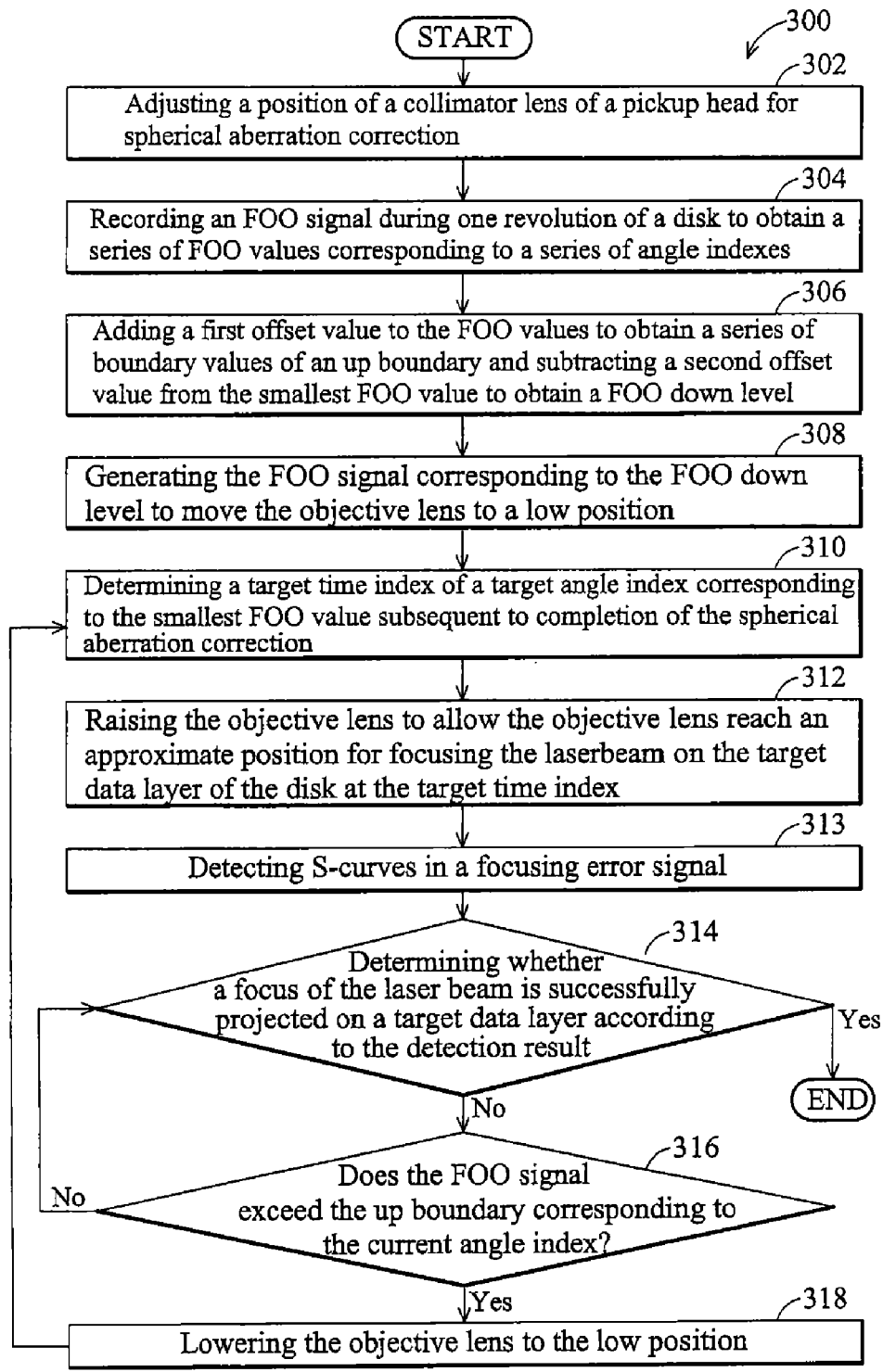
FIG. 3 is a flowchart of a method for controlling layer changes for an optical disk drive according to and embodiment of the invention.
Figure 4:
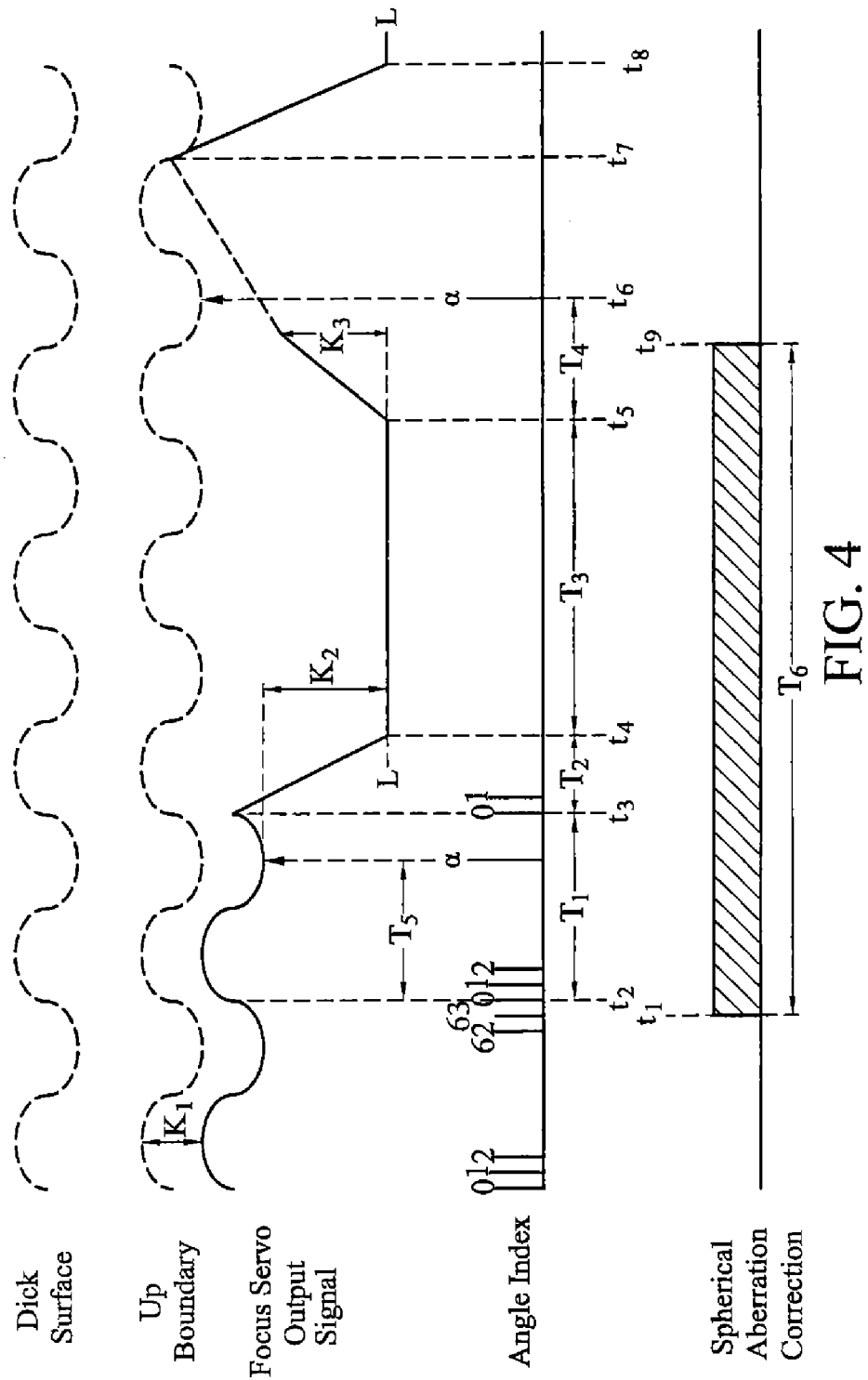
FIG. 4 is a schematic diagram of timings of signals generated according to the method of FIG. 3 according to the invention.

FIG. 3 shows a flowchart of a method 300 for controlling layer changes for an optical disk drive 200 according to an embodiment of the invention. FIG. 4 shows a schematic diagram of timings of signals generated according to the method 300 of FIG. 3. The optical disk drive 200 performs layer change procedures according to the method 300. Referring to FIG. 3, when receiving a layer change command, the control module 202 triggers the spherical aberration correction module 216 to adjust a position of a collimator lens of the pickup head 204 for spherical aberration correction (step 302). The spherical aberration correction module 216 accordingly generates a spherical aberration correction signal SAC to control a stepping motor to move a collimator lens at time t1 as shown in FIG. 4. Because the spherical aberration correction process requires a longer period T6, the spherical aberration correction process is first performed.

The optical disk drive 200 then starts to perform a focus search process. When the focus search process is performed, the optical disk 250 is spun by the spindle motor 210. If the surface of the disk 250 is not perpendicular to the spinning axis of the spindle 210, the disk surface vertically moves up and down with the revolution angle of the disk 250, and there is a vertical relative motion between the disk surface and the pickup head 204, as shown in FIG. 4. To allow the position of the focus spot to stay on the swinging disk surface, the focusing error signal FE generated by the focusing error generator 206 is fed to the focus control module 214 which generates the focus servo signal FOO according to the focus error signal FE to change the vertical position of the objective lens 205 with the vertical swings of the disk surface. The focus servo signal FOO therefore reflects vertical swings of the disk 250.

A revolution index generator first repeatedly generates a series of angle indexes indicating revolution angles of the disk 250. In one embodiment, the angle indexes ranges from 0 to 63 during one revolution of the disk 250, as shown in FIG. 4. The control module 202 then records the FOO signal during one revolution period $T_1$ of the disk 250 to obtain a series of FOO values corresponding to the angle indexes at time $t_2$ (step 304). Thus, the FOO values can be taken as samples of vertical swings of the disk surface. Several important control factors can be determined according to the recorded FOO values. First, the control module 202 adds a predetermined offset value $K_1$ to the FOO values to obtain a series of boundary values corresponding to the angle indexes (step 306). The boundary values are then taken as an up boundary of the FOO signal, as shown in FIG. 4, for preventing the objective lens 205 from colliding with the swinging disk surface (step 316).

The control module 202 then selects the smallest FOO value from the series of the recorded FOO values. In an embodiment of the invention, the control module 202 determines a target angle index a corresponding to the smallest FOO value. The control module 202 then subtracts a predetermined offset value $K_2$ from the smallest FOO value to obtain a FOO down level L (step 306), and then controls the focus control module 214 to generate the FOO signal corresponding to the FOO down level L to move the objective lens 205 to a low position at time $t_3$ (step 308). A focus search and on time can be reduced by moving the pickup head 204 to the low position, since when the disk surface swings to the lowest position, the disk 250 has lowest vertical speed and the objective lens 205 and the disk 250 have smallest relative motion there between. It is noted that offset values $K_1$ and $K_2$ are predetermined that circuit designers may adjust the two values according to design necessity.

The movement of the objective lens 205 requires a time period $T_2$ and the focus control module 214 lowers the objective lens 205 to the low position to move the focus off the surface of the disk at time $t_4$. The control module 202 then determines a target time index $t_6$ corresponding to the target angle index a subsequent to completion of the spherical aberration correction (step 310), and then determines a standby period T3 according to the target time index $t_6$. The objective lens 205 is then held at the low position during the standby period $T_3$. After the standby period $T_3$ elapses, the control module 202 checks the recorded FOO values and triggers the focus control module 214 to generates the FOO signal having a value corresponding to the target angle index a accordingly to raise the objective lens 205 at a time $t_5$, allowing the objective lens 205 reach an approximate position for focusing the laserbeam on the target data layer of the disk 250 at the target time index $t_6$ (step 312). It is noted that in an embodiment of the invention, the objective lens 205 is raised by the FOO signal at a higher speed at time $t_5$ until the objective lens reaches a level ($L-K_3$), wherein $K_3$ is a predetermined offset value smaller than $K_2$. The objective lens 205 is then raised at a lower speed thereafter in order to perform a focus search, as shown by the dotted line. At the target time index $t_6$, because a portion of the disk surface irradiated by the laserbeam swings to a lowest point, the vertical relative motion between the disk 250 and the pickup head 204 is smallest.

The control module 202 determines the standby period $T_3$ and the target time index $t_6$ as follows. First, because the spherical aberration correction period $T_6$ can be estimated, the completion time $t_9$ of the spherical aberration correction process can be obtained, and the target time index $t_6$ which is the first time corresponding to the target angle index α is determined according to the completion time $t_9$. In addition, because a focus search period $T_4$ for moving the objective lens 205 from the low position to an approximate position focusing on the target data layer can be estimated, the standby end time $t_5$ can be determined according to the focus search period $T_4$ and the target time index $t_6$. The standby period $T_3$ is therefore obtained as the period between times $t_4$ and $t_5$.

Alternatively, the standby period $T_3$ is determined according to the following algorithms:

$$(N \times T_1 + T_5) > T_6 > ((N-1) \times T_1 + T_5) \quad (1)$$

$$(N \times T_1 + T_5) = (T_1 + T_2 + T_3 + T_4) \quad (2)$$

From equation (2), an equation is obtained as follows:

$$T_3 = (N-1) \times T_1 + T_5 - T_2 - T_4 \quad (3)$$

wherein N is a positive integer and is determined according to (1), $T_1$ is the period for the disk 250 to spin for one revolution, $T_2$ is the period lowering the objective lens 205 to the low position, $T_3$ is the standby period holding the objective lens 205 at the low position, $T_4$ is the period for moving the objective lens 205 from the low position to the approximate position and thus focusing the laserbeam on the target layer, $T_5$ is the period between the initial angle index 0 and the target angle index α, and $T_6$ is the period for completing the spherical aberration correction process.

When the objective lens 205 is raised to the approximate position at time $t_6$, the S-curve detector 212 starts to detect whether S-curves are present in the focusing error signal to determine whether a focus of the laserbeam is projected on the target data layer of the disk 250 (step 313). Because the objective lens 205 has the smallest relative motion with the swinging disk surface when the disk surface swings to the lowest point at time $t_6$, the focusing error signal has the smallest distortion caused by the vertical swings of the optical disk 250, and the S-curve detector 212 can determine focus-on of the target data layer with higher precision. In addition, because the time $t_6$ is the first time subsequent to completion of the spherical aberration correction for the disk surface to swing downwards to the lowest point, the time required by the entire layer change procedure is reduced, increasing performance of the optical disk drive 200.

If the S-curve detector 212 detects appearance of the S-curve corresponding to the target data layer in the focusing error signal FE (step 314), the focus of the laserbeam emitted by the pickup head 204 is successfully projected on the target data layer of the disk 250. The focus control module 214 then stops raising the objective lens 205 and enters closed loop control, and the layer change procedure is completed. Otherwise, the focus control module 214 continues to raise the objective lens 205 until the target S-curve is detected by the S-curve detector 212. To prevent the objective lens 205 from colliding with the surface of the disk 250, the control module 202 checks whether the FOO signal generated by the focus control module 214 is raised beyond the boundary value corresponding to the current angle index (step 316). When the FOO signal exceeds the boundary values of the up boundary, the control module 202 controls the focus control module 214 to lower the objective lens 205 to the low position (step 318). Thus, the objective lens 205 never collides with the disk 250 even if the S-curve detection during focus search is unsuccessful. Conversely, if the FOO signal does not exceed the boundary values of the up boundary, the method 300 goes back to step 313 and the S-curve detector 212 continue to detect S-curves in the focusing error signal.

Figure 5:
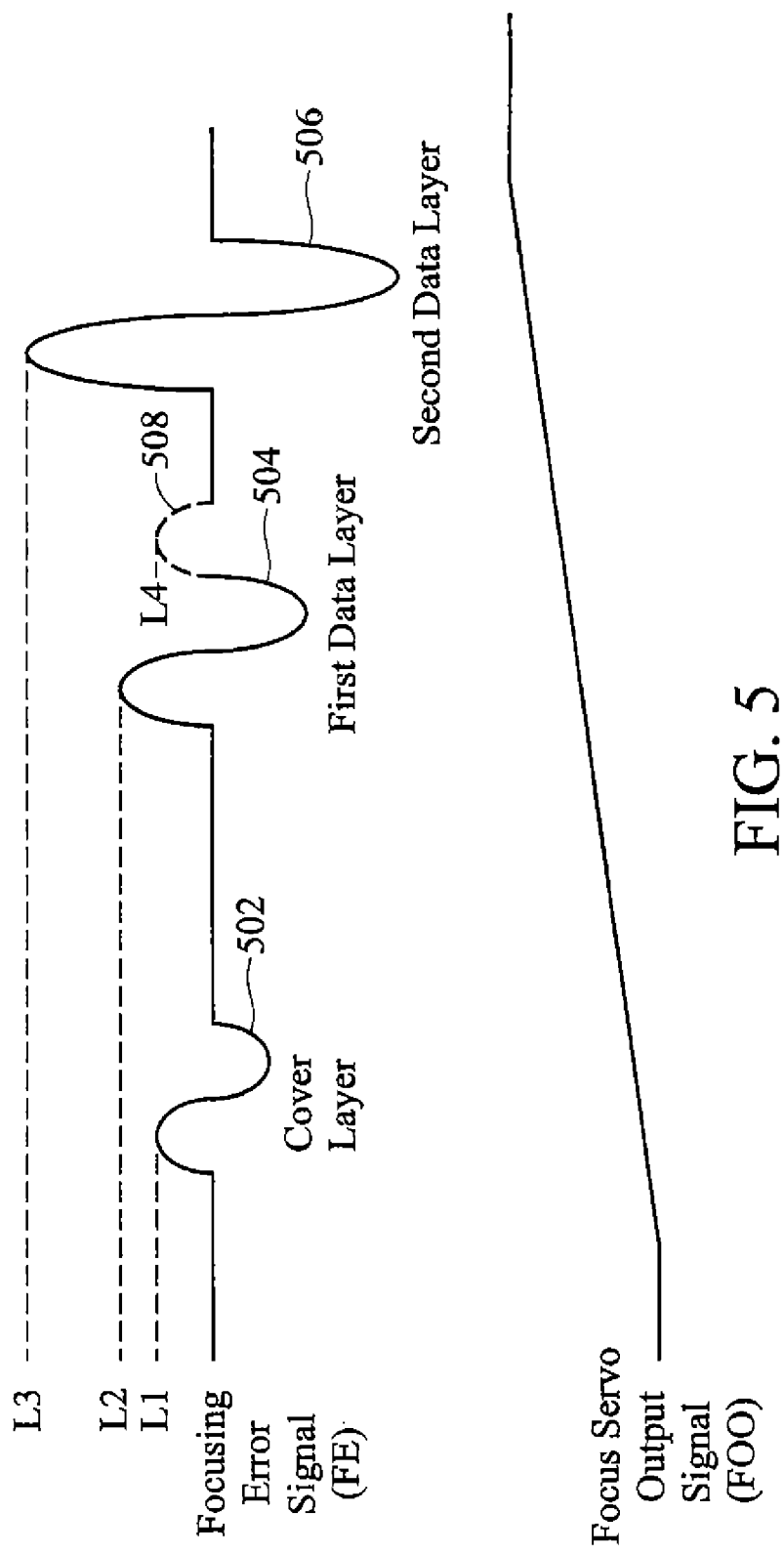
FIG. 5 shows a focusing error signal generated when a pickup head is being raised from a low position towards a disk.

The S-curve detector 212 of the optical disk drive 200 detects S-curves of the focusing error signal FE according to a predetermined identification threshold. When a level of the focusing error signal FE exceeds the identification threshold, occurrence of an S-curve is determined. Referring to FIG. 5, a focusing error signal generated when the objective lens 205 is being raised from a low position towards a disk is shown. The focus servo output signal FOO is raised from the FOO down level corresponding to the low position. Three S-curves 502, 504, and 506 are present in the focusing error signal FE, wherein the first S-curve 502 corresponds to a cover layer of the optical disk 250, the second S-curve 504 corresponds to a first data layer of the optical disk 250, and the third S-curve 506 corresponds to a second data layer of the optical disk 250. The first S-curve 502, second S-curve 504, and third S-curve 506 respectively have peak levels L1, L2, and L3.

A conventional S-curve detector simply sets an invariant identification threshold between the levels L1 and L2. Thus, only the S-curves 504 and 506 corresponding to the first data layer and the second data layer are determined. When the difference between the levels L1 and L2 is small, a slight distortion of the focusing error signal FE may cause misidentification of the S-curves. For example, the conventional S-curve detector may misidentify the signal distortion section 508 having a peak level L4 higher than the level L1 as the S-curve corresponding to the second data layer, inducing errors in the layer change procedure.

Figure 6:
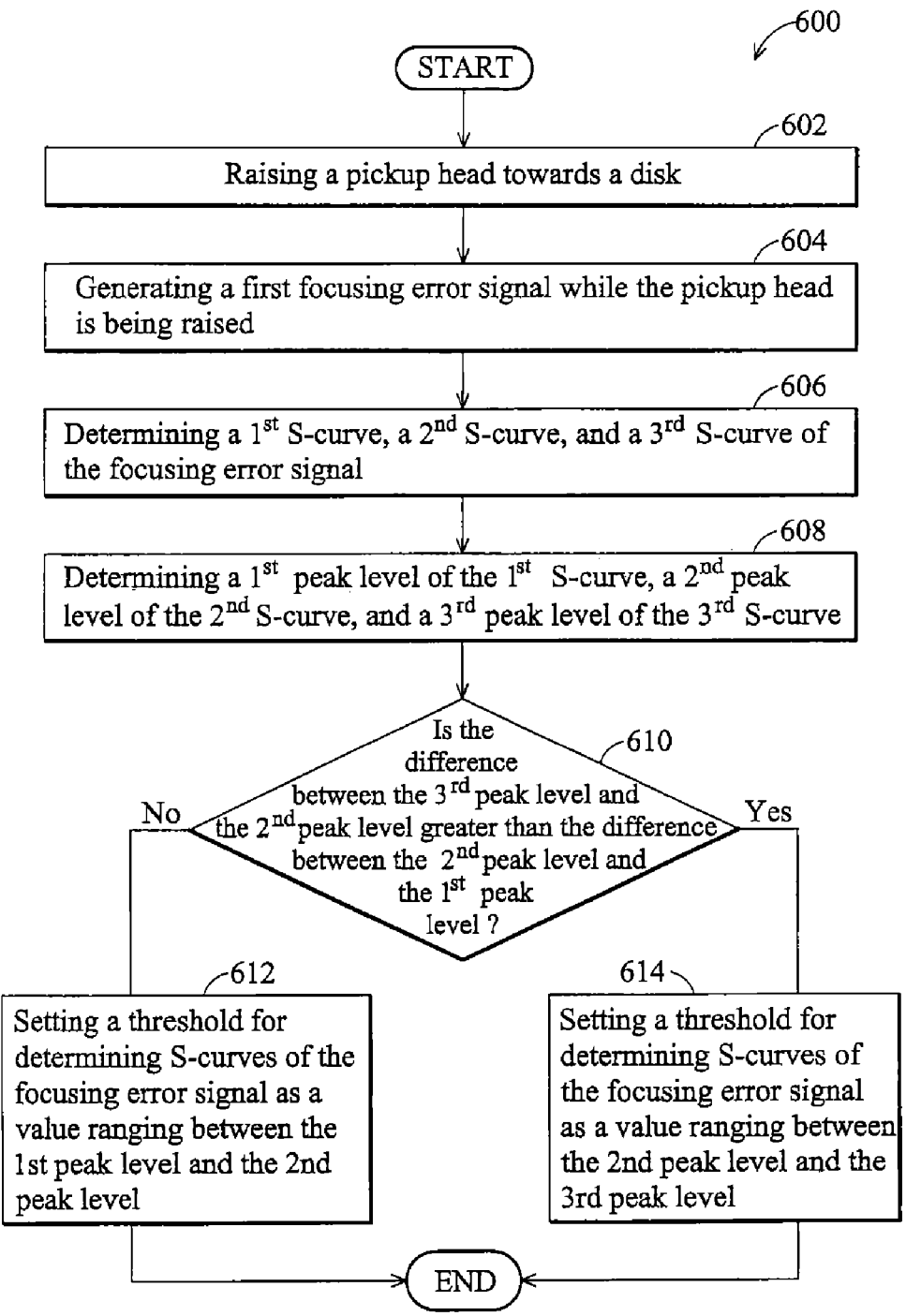
FIG. 6 is a flowchart of a method for performing a focus search of an optical disk drive according to the invention.

The invention therefore provides a method for dynamically setting an identification threshold for the S-curve detector 212. Referring to FIG. 6, a flowchart of a method 600 for performing a focus search process of an optical disk drive 200 according to the invention is shown. The control module 202 first triggers the focus control module 214 to raise the objective lens 205 towards a disk 250 (step 602). The focus error generator 206 then generates a first focusing error signal FE while the objective lens 205 is raised (step 604). The S-curve detector 212 then determines a first S-curve 502, a second S-curve 504, and a third S-curve 505 of the first focusing error signal FE (step 606). The control module 202 then determines a first peak level L1 of the first S-curve 502, a second peak level L2 of the second S-curve 504, and a third peak level L3 of the third S-curve 506 (step 608).

The control module 202 then dynamically sets an identification threshold of the S-curve detector 212 for determining S-curves of the focusing error signal FE. The control module 202 compares a first difference between the second peak level L2 and the first peak level L1 with a second difference between the third peak level L3 and the second peak level L2 (step 610). When the first difference is greater than the second difference, the control module 202 sets the identification threshold as a first value ranging between the first peak level L1 and the second peak level L2 (step 612). In an embodiment of the invention, the first value equals the average of the first peak level L1 and the second peak level L2. When the first difference is determined to be less than the second difference in step 610, the control module 202 sets the identification threshold as a second value ranging between the second peak level L2 and the third peak level L3 (step 614). In an embodiment of the invention, the second value equals the average of the second peak level L2 and the third peak level L3. Thus, the identification threshold of the S-curve detector 212 is dynamically adjusted.

When the focus control module 214 lowers the objective lens 205 to the low position (step 308) and then raises the objective lens 205 towards the disk 250 (step 312), the S-curve detector 212 can detect S-curves of the focusing error signal FE according to the identification threshold set according to the method 600 (step 313). A second focusing error signal FE is generated while the objective lens 205 is being raised, as shown in FIG. 5. When the identification threshold is set as the first value (step 612), the S-curve detector 212 determines a first S-curve occurrence 504 and a second S-curve occurrence 506 according to the identification threshold, wherein the first S-curve occurrence is identified as a focus position of the first data layer and the second S-curve occurrence is identified as a focus position of the second data layer. When the identification threshold is set as the second value (step 614), the S-curve detector 212 only determines an S-curve occurrence 506 according to the identification threshold, wherein the S-curve occurrence is identified as a focus position of the second data layer. Thus, the signal distortion section 508 will not be mistaken as the S-curve corresponding to the second data layer when the identification threshold is set as the second value ranging between the second level L2 and the third level L3, thus improving accuracy and stability of the layer change procedure.

Figure 7:
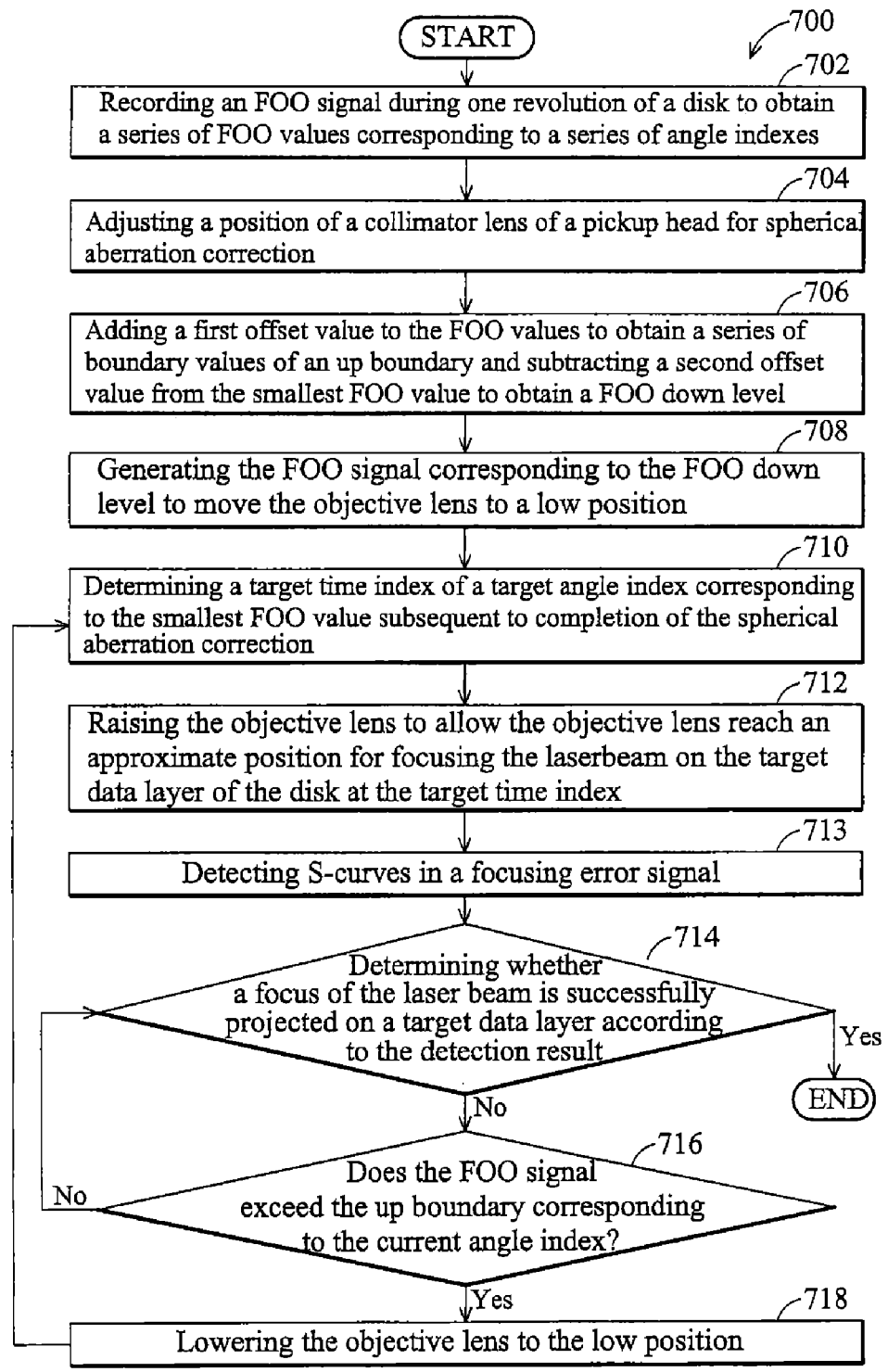
FIG. 7 is a flowchart of a method for controlling layer changes for an optical disk drive according to another embodiment of the invention.

Referring to FIG. 7, a flowchart of a method 700 for controlling layer changes for an optical disk drive 200 according to an embodiment of the invention is shown. The method 700 is similar to the method 300 shown in FIG. 3, except for the steps 702 and 704. In the method 700, a series of FOO signals are recorded prior to the position adjustment of the collimator lens. The spindle 210 spins the disk 250, and the control module 202 first records the FOO signal to obtain a series of FOO values corresponding to the series of angle indexes in step 702 as the step 304. The position of a collimator lens of the pickup head 204 is then adjusted for spherical aberration correction in step 704. The optical disk drive 200 then performs steps 706~718 as the steps 306~318 of the method 300.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A method for controlling layer changes for an optical disk drive, wherein a focus of a laserbeam emitted by a pickup head of the optical disk drive is moved from a current data layer of a disk to a target data layer of the disk, the method comprising:
    performing a spherical aberration correction process with respect to the target data layer;
    lowering an objective lens of the pickup head to a low position to move the focus of the laserbeam off the surface of the disk;
    raising the objective lens towards the disk;
    generating a focusing error signal while the objective lens is being raised;
    starting to detect whether a S-curve corresponding to the target data layer are present in the focusing error signal;
    generating a series of angle indexes corresponding to a plurality of revolution angles of the disk; and
    recording a focus servo output (FOO) signal during one revolution of the disk to obtain a series of FOO values with respect to the angle indexes.

2. The method as claimed in claim 1, wherein the method further comprises stopping raising the objective lens when the objective lens is raised beyond an up boundary.

3. The method as claimed in claim 1, wherein the method further comprises:
    determining the angle index corresponding to the smallest FOO value as a target angle index;
    determining a target time index corresponding to the target angle index subsequent to completion of the spherical aberration correction process; and
    directing the objective lens to reach an approximate position for focusing the laserbeam on the target data layer of the disk at the target time index.

4. The method as claimed in claim 1, wherein the FOO signal controls vertical motion of the objective lens, and the method further comprises:
    adding a first offset value to the FOO values to obtain a series of boundary values corresponding to the angle indexes, wherein the series of the boundary values forms an up boundary of the FOO signal;
    checking whether the FOO signal is raised beyond the up boundary when the objective lens is being raised according to the FOO signal; and
    lowering the objective lens to prevent the objective lens from collision with the disk when the FOO signal is raised beyond the up boundary.

5. The method as claimed in claim 1, wherein the FOO signal controls vertical motion of the objective lens and the method further comprises:

subtracting a second offset value from the smallest FOO value to obtain a FOO down level; and lowering of the objective lens to the low position by lowering the FOO signal to the FOO down level.

6. The method as claimed in claim 1, wherein the disk is a Blu-ray Disk (BD).

7. An optical disk drive, wherein a focus of a laserbeam emitted by a pickup head of the optical disk drive is moved from a current data layer of a disk to a target data layer of the disk for performing a layer change, and the optical disk drive comprising:

the pickup head, generating a reflection signal reflected from the disk with the laserbeam;

a spherical aberration correction module, adjusting a position of a collimator lens of the pickup head for spherical aberration correction;

a focusing error generator, generating a focusing error signal according to the refection signal;

a focus control module, generating a focus servo output (FOO) signal according to the focusing error signal to control vertical motion of an objective lens of the pickup head;

an S-curve detector, detecting whether an S-curve corresponding to the target data layer is present in the focusing error signal;

wherein the focus control module lowers the objective lens to a low position to move the focus of the laserbeam off the surface of the disk, then raises the objective lens towards the disk, and stops raising the objective lens when the S-curve detector detects the S-curve corresponding to the target data layer;

a revolution index generator, generating a series of angle indexes corresponding to a plurality revolution angles of the disk; and a control module, controlling the focus control module and the spherical aberration correction module, and recording the FOO signal during one revolution of the disk to obtain a series of FOO values corresponding to the angle indexes.

8. The optical disk drive as claimed in claim 7, wherein the control module determines the angle index corresponding to the smallest FOO value as a target angle index, determines a target time index corresponding to the target angle index when the spherical aberration correction module completes the spherical aberration correction, and trigger the focus control module to move the objective lens to an approximate position for focusing the laserbeam on the target data layer of the disk at the target time index; wherein the portion of the disk surface irradiated by the laserbeam swings to the lowest point at the target time index.

9. The optical disk drive as claimed in claim 7, wherein the control module adds a first offset value to the FOO values to obtain a series of boundary values corresponding to the angle indexes, checks whether the FOO signal is raised beyond the boundary values when the objective lens is being raised according to the FOO signal, and controls the focus control module to lower the objective lens to prevent the objective lens from collision with the disk when the FOO signal is beyond the boundary values; wherein the series of the boundary values forms the up boundary.

10. The optical disk drive as claimed in claim 7, wherein the control module subtracts a second offset value from the smallest FOO value to obtain a FOO down level, and controls the focus control module to lower the FOO signal to the FOO down level to lower the objective lens to the low position.

11. The optical disk drive as claimed in claim 7, wherein the disk is a Blu-ray Disk (BD) or a High Definition (HD) DVD.

12. A method for performing a focus search of an optical disk drive, comprising:

raising a objective lens towards a disk;

generating a first focusing error signal while the objective lens is being raised;

determining a first S-curve, a second S-curve, and a third S-curve of the first focusing error signal;

determining a first peak level of the first S-curve, a second peak level of the second S-curve, and a third peak level of the third S-curve;

comparing a first difference between the second peak level and the first peak level with a second difference between the third peak level and the second peak level;

setting an identification threshold for determining S-curves of a focusing error signal as a first value ranging between the first peak level and the second peak level when the first difference is greater than the second difference; and setting the identification threshold for determining S-curves of a focusing error signal as a second value ranging between the second peak level and the third peak level when the first difference is less than the second difference.

13. The method as claimed in claim 12, wherein the method further comprising:

lowering the objective lens to a low position;

raising the objective lens towards the disk;

generating a second focusing error signal while the objective lens is being raised; and determining occurrences of S-curves when the second focusing error signal is greater than the identification threshold.

14. The method as claimed in claim 13, wherein when the identification threshold is set as the first value, a first S-curve occurrence and a second S-curve occurrence are determined according to the second focusing error signal, wherein the first S-curve occurrence is identified as a focus position of a first data layer and the second S-curve occurrence is identified as a focus position of a second data layer.

15. The method as claimed in claim 13, wherein when the identification threshold is set as the second value, only an S-curve occurrence is determined according to the second focusing error signal, and the S-curve occurrence is identified as a focus position of a second data layer.

16. The method as claimed in claim 12, wherein the disk is a Blu-ray Disk (BD).

* * * * *